310-334 SR
XR 3,659,122

United Stat
Kaliski

[15] 3,659,122
[45] Apr. 25, 1972

[54] METHOD OF CONTINUOUS AMPLIFICATION OF SURFACE AND TRANSVERSE COUPLED ELASTIC-SPIN WAVES

[72] Inventor: Sylwester Kaliski, ul. Einstenia 17, Warszawa, 49, Poland

[22] Filed: Dec. 14, 1970

[21] Appl. No.: 97,500

[30] Foreign Application Priority Data

Dec. 13, 1969 Poland ....................137529

[52] U.S. Cl. ....................310/8.1, 310/8.2, 310/9.5, 310/9.7, 330/5.5, 333/30 R
[51] Int. Cl. ....................H01v 7/00
[58] Field of Search ....................310/8, 8.1, 8.2, 9.5, 9.7; 330/5.5; 333/30

[56] References Cited

UNITED STATES PATENTS

| | | | |
|---|---|---|---|
| 3,422,371 | 1/1969 | Poirer et al. | 310/8 X |
| 3,353,118 | 11/1967 | Olson et al. | 330/5.5 X |
| 3,290,610 | 12/1966 | Auld et al. | 330/5.5 X |
| 3,274,406 | 9/1966 | Sommers | 310/8.1 X |
| 3,173,100 | 3/1965 | White | 330/5.5 |

OTHER PUBLICATIONS

Stern, " Microsound Components, Circuits and Applications," Ultrasonics, October, 1969, 227-233

*Primary Examiner*—William M. Shoop, Jr.
*Assistant Examiner*—B. A. Reynolds
*Attorney*—Waters, Roditi, Schwartz & Nissen

[57] ABSTRACT

A method of continuous amplification of elastic-spin waves with use of a circuit of a slab ferromagnetic crystal on which a semi-conductor layer is superposed comprises generating a propagating waves in the slab, and applying a direct voltage to the semi-conductor layer to produce a current of drifting electrons in the layer, inducing an elastic wave in the layer through the propagating wave in the slab which produces a piezoelectric field in the layer, modulating the current of drifting electrons with the piezoelectric field, amplifying the elastic wave in the semi-conductor layer and in the slab when the drift velocity of the drifting electron reaches a critical velocity, and applying a constant magnetic field to the circuit to produce a spin-acoustic resonance, the elastic wave in the ferromagnetic slab amplifying the spin wave in the slab through spin-elastic coupling.

7 Claims, 1 Drawing Figure

3659122
OR IN 330/5.5

METHOD OF CONTINUOUS AMPLIFICATION OF SURFACE AND TRANSVERSE COUPLED ELASTIC-SPIN WAVES

BACKGROUND OF THE INVENTION

The invention relates to the method of continuous amplification of transverse and surface coupled elastic-spin waves in ferromagneto-piezosemiconductor circuits.

There is a known method of continuous amplification of elastic surface, transverse, and longitudinal waves in piezosemiconductor circuits formed of a semi-conductor crystal in which, due to irradiation, a sub-surface semiconducting layer is formed, and also in circuits consisting of a piezoelectric crystal and of a semiconducting layer superposed mechanically thereon.

This method in a piezoelectric crystal, comprises generating an elastic wave by a known method which, due to the piezoelectric effect, generates an electric field that modulates the electron current formed in the semiconducting layer under the influence of direct voltage applied to it through ohmic contacts. After exceeding the critical velocity of electron current, an amplification of the wave propagating in the piezoelectric crystal is achieved.

There is a known method of parametric amplification of magnetoelastic oscillations, whereby the elastic-spin coupling in ferromagnetic crystals such as iron-yttrium garnet is utilized. The drawback of such a type of circuit is the necessity of application of high-power pumping generators and its unsuitability for amplification of progressive waves.

There is also a known method of amplification of spin waves in ferromagnetic crystals by means of operating with an electromagnetic wave of the drifting plasma. However, due to high critical velocities of the plasma drift of the order of $10^7$ cm/s needed for the amplification of the spin wave, the possibility of practical utilization of such a circuit is very limited.

SUMMARY OF THE INVENTION

An object of the invention is the amplification of coupled elastic-spin waves with frequencies in the range of several hundred Hz to several GHz by means of utilizing the effects of electro-magnetic-elastic-spin coupling.

The above and other objects are achieved due to the application of a circuit including the ferromagnetic and piezosemiconductor properties simultaneously.

The method of amplification, according to the invention, enables an amplification of spin waves through elastic-spin coupling, and due to a synchronization of the circuit with an external constant magnetic field it is possible to obtain a controlled lag time of the amplified signal at the output of the circuit with regard to the input signal.

The method, according to the invention, can be realized by means of a crystal having ferromagneto-piezosemiconductor properties. However, since at present, crystals of such type are unknown, in which the electron mobility would enable a necessary velocity of the electron drift to be achieved, a combined circuit comprising a ferromagnetic crystal and a piezosemiconductor crystal can be employed.

The invention consists in that in a slab of ferromagnetic crystal on which a semiconducting layer is superposed, a surface wave is generated in a known way, which, in turn, generates an elastic wave in the semiconducting layer.

At the same time, direct voltage is applied to the semiconducting layer, which generates therein a current of drifting electrons, which current is modulated by an electric field generated in the semiconducting layer by the elastic wave, due to the piezoelectric effect.

At the critical velocity of the electron current drift, the current energy is transmitted to the elastic wave in the layer, which, in turn, through mechanical contact with ferromagnetic crystal amplifies the surface wave.

When the circuit is in the state of the spin-acoustic resonance, which is achieved by placing the circuit in a constant magnetic field, there results an amplification of the spin wave through the elastic-spin coupling.

For amplification of the transverse wave a monolithic ferromagneto-piezosemiconductor crystal can be used, which has an electron mobility enabling the critical velocity of the current to be achieved. Since such crystals are not available, they can be replaced by a circuit composed of ferromagnetic and semi-conductor crystal layers placed alternately one upon another, the thickness of said layers being smaller than the wave length. The principle of operation of the circuit is analogous to the amplification of the surface wave.

DETAILED DESCRIPTION

Figure 1:
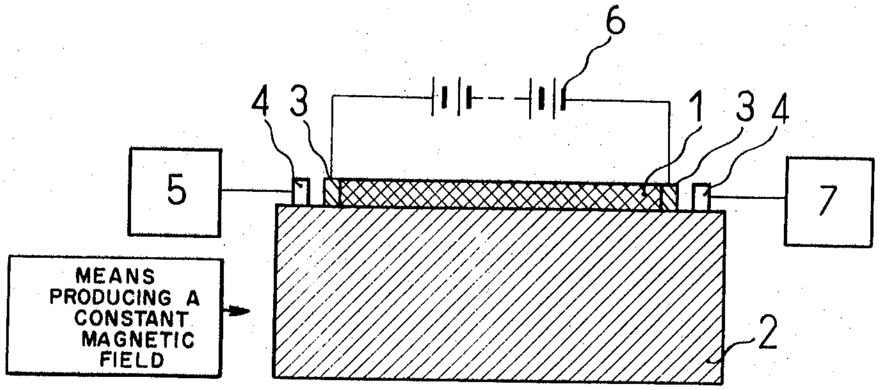
FIG. 1 is an example of an embodiment of the circuit comprising a slab of iron-yttrium garnet and a subsurface semiconducting layer of cadmium sulphide.

In slab 2 formed of, for example, iron-yttrium garnet a surface wave is generated. This wave is generated by known methods through finger structures 4 from a generator 5. At the same time, to a layer of cadmium sulphide 1 through ohmic contacts 3 a direct voltage from a source 6 is applied, which causes in the layer an electron drift.

The elastic wave propagating in the slab 2 generates, through mechanical contact, an elastic wave in the layer 1, which generates a piezoelectric field that modulates the current of drifting electrons.

At the critical velocity of the electron drifting current, an amplification of the elastic wave in the layer 1 results, due to which, the elastic-spin coupling in the space of the spin-acoustic resonance amplifies by many times the spin wave supplied to a receiver 7. The state of spin-acoustic resonance is achieved by placing the circuit in a constant magnetic field. The semiconducting layer can be superposed on the slab mechanically or epitaxially.

In case of the amplification of a transverse wave, the electric direct voltage from source 6 is applied to the lateral surfaces of the multi-layer crystal, being vertical to the direction of the wave generated by the known coupling circuits from the generator 5.

For the amplification of surface waves, the natural refrigeration of the circuit will suffice, while for the transverse waves additional refrigeration with a view of improving the parameters of the circuit can be employed.

What is claimed is:

1. A method of continuous amplification of elastic-spin waves in a circuit of a slab of ferromagnetic crystal on which a semi-conductor layer is superposed, said method comprising generating a propagating wave in said slab, applying a direct voltage to said semi-conductor layer to produce a current of drifting electrons in said layer, inducing an elastic wave in said layer through the propagating wave in said slab which produces a piezoelectric field in said layer, modulating the current of drifting electrons with said piezoelectric field, amplifying the elastic wave in said semiconductor layer and in said slab when the drift velocity of said drifting electrons reaches a critical velocity, and applying a constant magnetic field to the circuit to produce a spin-acoustic resonance, the elastic wave in the ferromagnetic slab amplifying the spin wave in said slab through spin-elastic coupling.

2. A method of continuous amplification of elastic-spin waves as claimed in claim 1, wherein said propagating wave is a surface wave.

3. A method of continous amplification of elastic-spin waves as claimed in claim 1, wherein said propagating wave is a transverse wave.

4. A method of continous amplification of elastic-spin waves as claimed in claim 1, wherein said slab is iron-yttrium garnet and said semiconductor layer is cadmium sulfide.

5. A method of continuous amplification of elastic-spin waves as claimed in claim 1, wherein said circuit comprises alternating layers of said slab and said semiconductor layer.036591220

6. A method of continuous amplification of elastic-spin waves as claimed in claim 1, comprising epitaxially joining said semiconductor layer to said slab.

7. A method of continuous amplification of elastic-spin waves as claimed in claim 1, comprising mechanically joining said semiconductor layer to said slab.

* * * * *